(12) United States Patent
Nattermann et al.

(10) Patent No.: US 11,661,063 B2
(45) Date of Patent: May 30, 2023

(54) METHOD FOR DETERMINING A LANE CHANGE, DRIVER ASSISTANCE SYSTEM AND VEHICLE

(71) Applicant: ZF FRIEDRICHSHAFEN AG, Friedrichshafen (DE)

(72) Inventors: Till Nattermann, Krefeld (DE);
Christian Wissing, Wesel (DE);
Manuel Schmidt, Dortmund (DE);
Andreas Homann, Dortmund (DE);
Christian Lienke, Gelsenkirchen (DE);
Niklas Stannartz, Dortmund (DE);
Torsten Bertram, Düsseldorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 278 days.

(21) Appl. No.: 16/994,883

(22) Filed: Aug. 17, 2020

(65) Prior Publication Data
US 2021/0053571 A1 Feb. 25, 2021

(30) Foreign Application Priority Data
Aug. 19, 2019 (DE) .......................... 102019122249.4

(51) Int. Cl.
*B60W 30/18* (2012.01)
*G06F 17/18* (2006.01)
*B60W 40/105* (2012.01)

(52) U.S. Cl.
CPC .... *B60W 30/18163* (2013.01); *B60W 40/105* (2013.01); *G06F 17/18* (2013.01); *B60W 2554/4042* (2020.02)

(58) Field of Classification Search
CPC ......... B60W 30/18163; B60W 40/105; B60W 2554/4042; B60W 2720/103; G06F 17/18
See application file for complete search history.

(56) References Cited

U.S. PATENT DOCUMENTS

| | | | |
|---|---|---|---|
| 7,534,854 B1 | 5/2009 | Paulauskas et al. | |
| 2016/0107687 A1* | 4/2016 | Yamaoka | B62D 15/025 |
| | | | 701/41 |
| 2016/0297447 A1* | 10/2016 | Suzuki | B60W 30/16 |
| 2016/0339919 A1* | 11/2016 | Habu | B60W 30/0956 |
| 2018/0043935 A1* | 2/2018 | Hashimoto | G08G 1/20 |
| 2018/0175391 A1 | 6/2018 | Komura et al. | |
| 2019/0329762 A1* | 10/2019 | Kwon | B60W 30/18163 |
| 2022/0105929 A1* | 4/2022 | Takei | B60W 30/0956 |

FOREIGN PATENT DOCUMENTS

| | | |
|---|---|---|
| GB | 1194176 | 6/1970 |
| GB | 2529105 | 2/2016 |
| WO | 2008084732 | 7/2008 |

* cited by examiner

*Primary Examiner* — Peter D Nolan
*Assistant Examiner* — Ashley L Redhead, Jr.
(74) *Attorney, Agent, or Firm* — Tarolli, Sundheim, Covell & Tummino LLP

(57) ABSTRACT

The invention relates to a method for determining a lane change for a driver assistance system (100) of a vehicle (1), which method comprises calculating (220) a probability that other vehicles (2) are driving at a higher speed in a lane (L2) which is adjacent to a current lane (L1) of the vehicle (1), applying (240) a hysteresis to the calculated probability based on a driving parameter dependent on a last lane change, and issuing (250) a command to change lanes depending on the probability. The invention further relates to a driver assistance system and a vehicle which can carry out such a method.

12 Claims, 4 Drawing Sheets

METHOD FOR DETERMINING A LANE CHANGE, DRIVER ASSISTANCE SYSTEM AND VEHICLE

RELATED APPLICATION

This application claims priority from German Application No. 10 2019 122 249.4, filed Aug. 19, 2019, the subject matter of which is incorporated herein by reference in its entirety.

BACKGROUND

The invention relates to a method for determining a lane change, a driver assistance system that is set up to carry out a corresponding method, and a vehicle with such a driver assistance system. In particular, a method, a driver assistance system and a vehicle are described in which a command to change the lane is produced by calculating a probability that a higher speed is being driven in an adjacent lane and by applying a hysteresis to this probability.

Driver assistance systems which not only support the driver, and thus increase safety, but which also carry out autonomous or semi-autonomous journeys (driving processes) are increasingly being integrated into vehicles. With adaptive cruise control (ACC), the vehicle can be controlled so that it maintains a predetermined target speed as long as the route is free of other vehicles or objects. If the controlled vehicle approaches a vehicle in front or a (stationary) object, the speed is adjusted, for example reduced, in order to avoid a collision with the vehicle/object. The controlled vehicle can thus drive at the speed of the vehicle in front at a predetermined distance from the vehicle in front.

In addition to lane keeping assistants, which point out to the driver that the vehicle may be unintentionally departing from a current lane, the vehicle can also change lanes autonomously or partially autonomously. Such a lane change can, on the one hand, be a necessary lane change based on the calculated route, for example in order to follow a specific route to a destination that has been input. Extended systems also allow a discretionary lane change, for example to overtake a (slower) vehicle in front or to drive in a certain lane on a multi-lane road (e.g. German right-hand drive law). However, these systems, which can perform a discretionary lane change, as described, for example, in "Highly Automated Driving on Freeways in Real Traffic Using a Probabilistic Framework" (Michael Ardelt, et al., IEEE Transactions on Intelligent Transportation Systems, Vol. 13, No. 4, Dec. 4, 2012), always decide on the basis of the current traffic situation around the driver's vehicle whether a lane change should be carried out or not.

OBJECT OF THE INVENTION

Despite existing systems for autonomous/semi-autonomous vehicle control, there is a need for an improved method for determining a lane change and a corresponding driver assistance system which increase the safety of road users and the comfort for occupants during an autonomous or semi-autonomous driving process.

Proposed Solution

This technical object is achieved by a method with the features of claim 1, a driver assistance system with the features of claim 9 and a vehicle with the features of claim 10. Advantageous embodiments are defined by the further claims.

According to one aspect for a better understanding of the present disclosure, a method for determining a lane change for a driver assistance system comprises calculating a probability that, in a lane that is adjacent to a current lane of the vehicle, other vehicles are driving at a higher speed, applying a hysteresis to the calculated probability based on a driving parameter dependent on the last lane change, and issuing a command to change the lane depending on the probability.

The adjacent lane can be both the lane to the left of the currently used lane and the lane to the right of the currently used lane. These can be lanes of a road that are used in the same direction of travel, for example in the case of a multi-lane road (at least two lanes with the same direction of travel). Of course, the method can also be used on a road with one lane in each case in opposite directions of travel. However, changing lanes is only an option here for an overtaking maneuver. When calculating the probability that vehicles in the adjacent lane will travel at a higher speed, the maximum permissible speed is used, since in most cases there should be no other vehicles in the adjacent lane in the same direction as the driver's vehicle. When calculating the probability, however, it can also be taken into account that a higher speed can be driven in an empty lane (there are no other vehicles in this lane).

By applying the hysteresis to the calculated probability, it is possible to prevent lane changes from being carried out in rapid succession. If a command to change lanes would already be issued in a conventional method because the probability lies in a corresponding positive range for a lane change, the present method prevents or suppresses this output of the command to change lanes by applying the hysteresis. As a result, other road users are not irritated and/or endangered, and also the occupants of the driver's vehicle are not exposed to a rapid succession of lane changes which are usually perceived as unpleasant.

The calculated probability (after applying the hysteresis) can be compared with a threshold value for issuing the command to change lanes. If the calculated probability lies above the threshold value, the command to change lanes is issued. For example, if the probability is greater than 50%, preferably greater than 70%, and particularly preferably greater than 90%, a corresponding lane change command can be issued.

Issuing the command to change lanes does not have to mean that the driver assistance system also carries out a lane change. Rather, it is a recommendation for a discretionary lane change. The lane change can thus be carried out by means of a corresponding module or a corresponding component for autonomous/partially autonomous driving, which takes into account other vehicles and objects located around the driver's vehicle. Likewise, a lane change determined by the method can be disregarded if the vehicle is guided along a route (for example together with a navigation system), wherein the route (soon) requires the vehicle to move in the opposite direction to the lane change. The command to change lanes can also be suppressed/prevented if, for example, the lane to be changed to soon ends according to map data stored/available in the driver assistance system. This avoids the lane changes that are perceived by the occupants as uncomfortable, in which a lane change to the previous lane would have to be carried out again after a short time.

Furthermore, the driving parameter for the hysteresis can be, for example, a distance traveled since the last lane change and/or a time period that has elapsed since the last lane change. The command to change lanes is only issued when the distance traveled and/or the elapsed time period corresponds to a threshold value or is greater. In other words, the issuance of the command to change lanes is suppressed for the predetermined distance and/or time period (threshold value). This increases the safety for the driver's vehicle and other vehicles present in the environment, since the driver's vehicle does not frequently change lanes, which may force other vehicles to perform driving maneuvers. The occupants of an autonomously/partially autonomously controlled vehicle also perceive frequent lane changes as unpleasant, which is avoided by the method described here.

Alternatively or additionally, the method may comprise applying a leak integrator to the calculated probability before the hysteresis is applied. Applying a leak integrator to the calculated probability allows the probability to be changed with otherwise (almost) the same starting conditions. Of course, the leak integrator can also be used after the hysteresis is applied. The function of the leak integrator usually only comes into play when the starting conditions that are otherwise (almost) the same are present over a certain period of time. Accordingly, the influence of the hysteresis on the calculated probability is usually already ended before the functionality of the leak integrator takes effect.

For example, the leak integrator can increase the calculated probability over time. This means that with otherwise (almost) the same starting conditions (input parameters), the probability that other vehicles will drive at a higher speed in the lane adjacent to the current lane of the vehicle is slowly and/or continuously increased, so that the method issues the command to change lanes at some point.

The use of the leak integrator can also be made dependent on conditions. For example, the leak integrator can only be used if there is another vehicle in front of the driver's vehicle and/or if the actual speed of the driver's vehicle is slightly below (in a certain range below) the target speed (for example between 80% and 95% of the target speed). As a result, the lane change can also be carried out if the driving parameters underlying the conditions lie in limiting ranges for actually triggering a lane change. This increases the comfort of the occupants by avoiding frustration of the occupants when driving in the same lane for a longer period of time or distance, although the set driving parameters for autonomous/semi-autonomous driving are not reached.

In an alternative or additional variant, the method can comprise resetting the leak integrator and/or the hysteresis when a lane change takes place. Normally, after each lane change, the occupants of the vehicle feel that the driver assistance system controls the vehicle according to the wishes of the occupants, so that the occupants' "frustration" is, so to speak, relieved. Alternatively or additionally, the leak integrator and/or the hysteresis can also be reset when external parameters change significantly. For example, in the event that the end of a traffic jam is reached and the speed in the lane of the driver's vehicle is greatly reduced, or if it is recognized that the driver's vehicle is being overtaken by another (faster) vehicle (which may correspond to a substantial increase in the probability that the driving speed is higher in another lane), the leak integrator and/or the hysteresis can be reset in order to determine in the normal course of the method whether a lane change should be carried out. Such external events are also perceived by the occupants as a change that removes a possible frustration due to continuous driving without reaching the target driving parameters.

In a likewise alternative or additional variant of the method, this can comprise determining an actual speed of the vehicle and a target speed of the vehicle and comparing a deviation of the actual speed from the target speed with a threshold value. This allows the steps of applying hysteresis, using a leak integrator and/or issuing a command to change lanes to be carried out only if the deviation is greater than or equal to the threshold value. Thus, a lane change is avoided when the target speed is reached or in the event of small fluctuations in the actual speed below the target speed. This also increases safety during autonomous/semi-autonomous driving, since no lane change is carried out (for example, for an overtaking maneuver), although the target speed has almost been reached, which could slow down other vehicles in the lane to which the driver is changing. The threshold value can correspond, for example, to 95% of the target speed, wherein an actual speed above this threshold value prevents the above-mentioned method steps.

In a further alternative or additional variant of the described method, the calculation of a probability can comprise determining a normal distribution of the driving speed for each lane, and calculating a difference distribution by subtracting the normal distribution of the driving speed of an adjacent lane from the normal distribution of the driving speed of the current lane of the vehicle. Here, the calculation of the probability that other vehicles are traveling at a higher speed in the lane adjacent to a current lane of the vehicle can be carried out on the basis of the calculated difference distribution. By determining the normal distribution of the driving speed for each lane and including it in the decision as to whether a lane change is to be carried out, inaccuracies are taken into account. For example, inaccuracies in the sensor system (sensors for detecting the vehicle environment, for example the location and speed of another vehicle) are compensated for by determining a probability of the driving speed in each lane and, for example, assuming a normal distribution here.

Furthermore, calculating a difference distribution can comprise forming a difference between the mean values of the respective normal distribution of the driving speed for each lane and adding the variance of the respective normal distribution of the driving speed for each lane. In other words, a distribution of the speed probability is determined using the following equations:

$$\bar{v}_{\mathit{diff}} = \bar{v}_{L1} - \bar{v}_{L2} \tag{1},$$

$$\mu_{\mathit{diff}} = \mu_{L1} - \mu_{L2} \tag{2), und}$$

$$\sigma_{\mathit{diff}}^2 = \sigma_{L1}^2 + \sigma_{L2}^2 \tag{3},$$

in which $\bar{v}_{\mathit{diff}}$ from equation (1) represents the difference distribution (constitutes a random variable), which is the mean $\mu_{\mathit{diff}}$ from equation (2) and the standard deviation (variance) $\sigma_{\mathit{diff}}^2$ from equation (3). The suffix "L1" here designates the first lane, that is, the current lane of the driver's vehicle, and the suffix "L2" designates the second lane, that is, the adjacent lane into which it would be possible to change.

The probability of other vehicles driving at a higher speed in the lane that is adjacent to a current lane of the vehicle can thus be calculated as follows:

$$P(\bar{v}_{\mathit{diff}} \leq 0) = P(\bar{v}_{L1} - \bar{v}_{L2} \leq 0) = \int_{-\infty}^{0} p_{\bar{v}_{\mathit{diff}}}(t)dt = e \tag{4}.$$

where the value "e" represents the calculated probability of the method and is used for further calculations and method steps.

To simplify the calculation, the respective normal distribution for the first and second lanes can be shifted by a desired speed (target speed). Since the driving speeds prevailing in the various lanes are very probably in a range of the desired speed, the calculations in relation to the aforementioned equations (1) to (4) result in lower values which can be processed more quickly.

According to a further aspect for a better understanding of the present disclosure, a driver assistance system for a vehicle comprises at least one sensor that is set up to record and/or to process at least one driving parameter of the vehicle, and a controller that is coupled to the at least one sensor and is set up to carry out the method for determining a lane change according to the first aspect. The sensor can be a camera, at least part of a radar system, at least part of a lidar system and/or an ultrasonic sensor. The sensor can also be implemented in the form of a sensor system with at least one component that processes the sensor data.

The driver assistance system can be used both for autonomous/partially autonomous driving to calculate the possibility of a lane change and also for driving controlled by a person to give the driver an indication that a lane change is possible. For example, the driver can be given an acoustic or visual indication that a higher driving speed could be achieved in an adjacent lane.

According to a further aspect for a better understanding of the present disclosure, a vehicle comprises such a driver assistance system.

The aspects, variants and implementation options described above can be combined independently of the combinations described and regardless of the sequence described. Aspects, variants and implementation options that are not explicitly described are thus also included in the present disclosure.

BRIEF DESCRIPTION OF THE DRAWINGS

Further objectives, features, advantages and possible applications result from the following description of embodiments, to be understood as non-restrictive, with reference to the associated drawings. Thereby, all described and/or illustrated features, on their own or in any combination, show the object disclosed here, also independently of their grouping in the claims or their dependencies. The dimensions and proportions of the components shown in the drawings are explicitly not to scale.

DETAILED DESCRIPTION OF THE DRAWINGS

Figure 1:
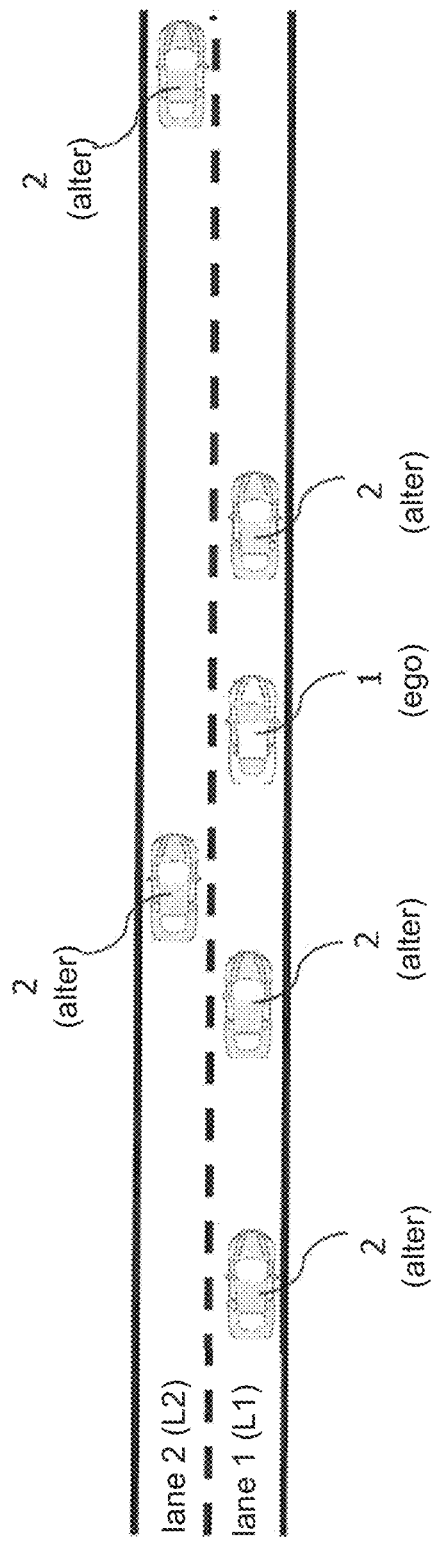
FIG. 1 schematically shows an example of a multi-lane road with a vehicle with the driver assistance system disclosed here and a number of other vehicles.

Comparable or identical and equally effective components and features are marked with the same reference signs in the drawings. In some cases, reference signs of individual features and components have been omitted in the drawings for reasons of clarity, although these features and components are already provided with reference signs in other drawings. The components and features, which are not described again in relation to the further drawings are similar in their formation and function to the corresponding components and features according to the other drawings.

Figure 2:
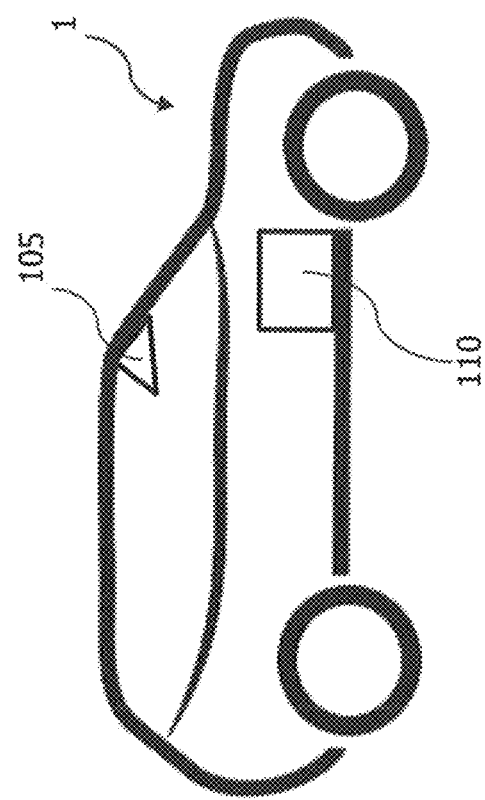
FIG. 2 schematically shows a vehicle with a driver assistance system.

FIG. 1 schematically shows an example of a multi-lane road with a vehicle 1 with the driver assistance system 100 disclosed here (see FIG. 6) and a large number of other vehicles 2. The vehicle 1 with the driver assistance system 100 disclosed here (hereinafter also referred to as the driver's vehicle or "ego") is currently traveling in a first lane L1 and, for example, is approaching another vehicle 2 driving in front (also referred to as "alter"). The multi-lane road further comprises a second lane L2, which is traveled here in the same direction as the first lane L1. As will be explained in more detail below, the driver assistance system 100 can comprise at least one sensor 105 (FIG. 2) and a controller 110. The at least one sensor 105 is set up to record and/or to process at least one driving parameter of the vehicle 1. In this way, the sensor 105 can record a driving parameter in front of, next to and/or behind the vehicle 1 and output it to the controller 110 coupled to the sensor 105 in accordance with environmental data of the vehicle 1.

Figure 3:
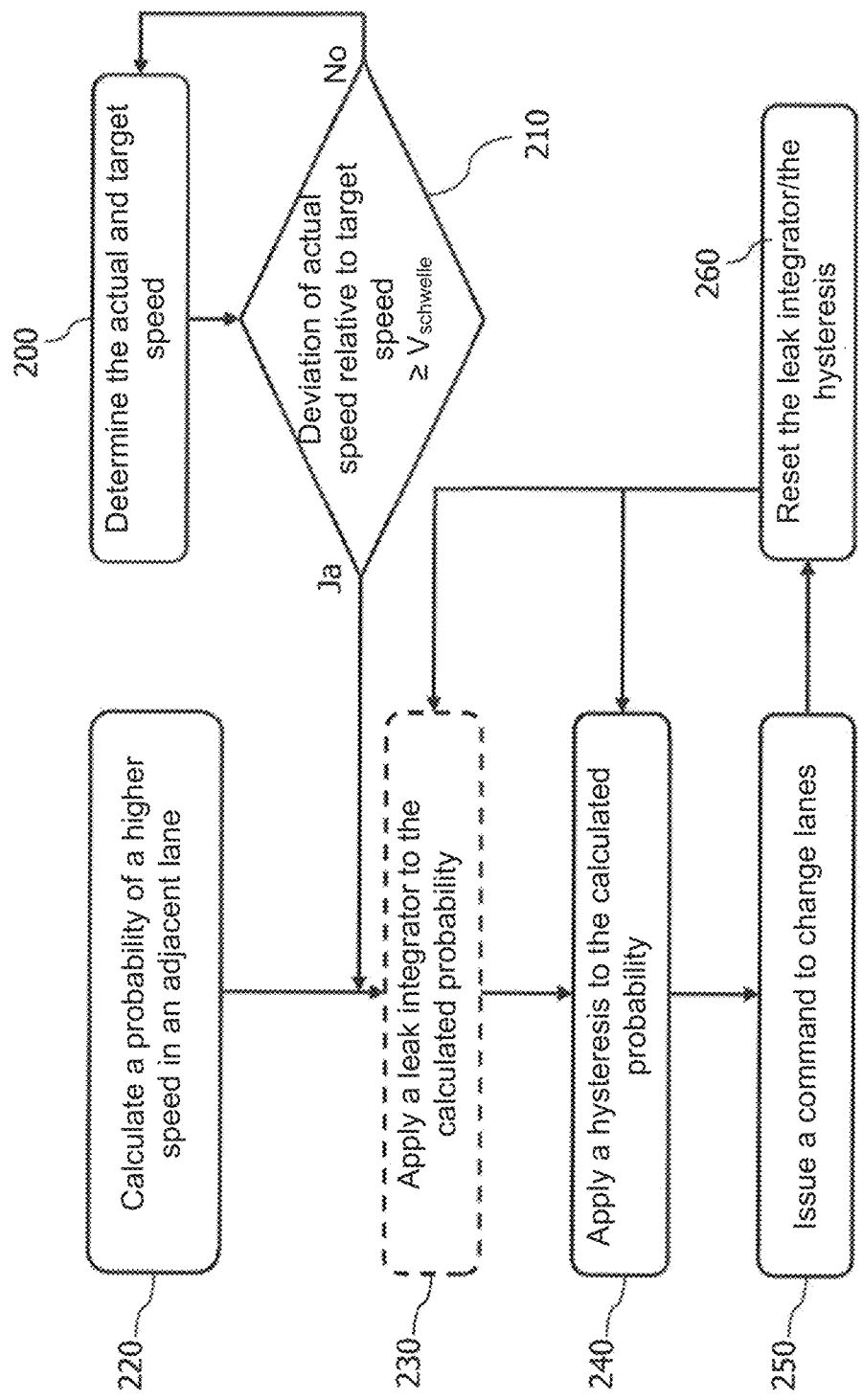
FIG. 3 schematically shows a flow diagram for a method for determining a lane change.

FIG. 3 schematically shows a flow diagram for a method for determining a lane change. For example, controller 110 may be configured to perform the method. The controller 110 can be an electronic component of the vehicle 1 and/or can be integrated into an existing on-board electronics of the vehicle 1.

In an optional preliminary check within the method, an actual speed and a target speed of the vehicle 1 can be determined in accordance with step 200. The actual speed can be detected/calculated via the at least one sensor 105, and usually a vehicle 1 already has corresponding driving parameter data. The actual speed can thus be retrieved by an electronic control unit (ECU—for example controller 110) via a bus. The target speed of the vehicle 1 is either entered by the driver or specified by a controller for autonomous/semi-autonomous driving. This controller can also be the controller 110 or a separate electronic component.

In the subsequent step 210, the actual and target speeds are related to one another and their deviation is compared to a threshold value. If the deviation is below the threshold value, the process jumps back to step 200, so that no lane change is considered.

Independently of the optional steps 200 and 210, the method can begin with step 220, in which a probability is calculated that other vehicles 2 are driving at a higher speed in a lane (for example lane L2) which is adjacent to a current lane (L1) of the vehicle 1. In other words, it is determined whether a higher speed is possible for the driver's vehicle 1 in the adjacent lane L2.

Figure 4:
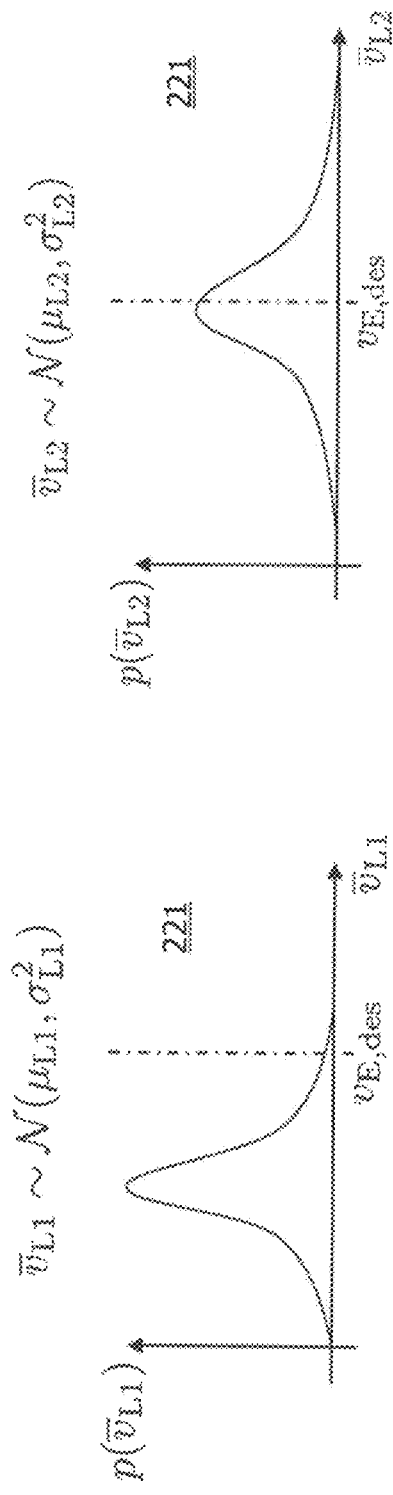
FIG. 4 schematically shows exemplary normal distributions of the speed in the first and second lanes.

In this regard, FIG. 4 schematically shows exemplary normal distributions $\bar{v}_{L1}$ and $\bar{v}_{L2}$ of the respective speed in a first lane L1 and a second lane L2, which distributions are used to calculate the above-mentioned probability. The consideration of a probability of the speed in the respective lane L1, L2 instead of a fixed variable allows inaccuracies in the underlying data to be taken into account. The underlying data are determined, for example, via at least one sensor 105, wherein the one or more sensors 105 can deliver different measurement results and/or can include inaccuracies and/or tolerances. The normal distributions $\bar{v}_{L1}$ and $\bar{v}_{L2}$ can be estimated, for example using Kalman filters, which are coupled to the at least one sensor 105 (sensor system) and receive data from the latter as an input signal.

Figure 5:
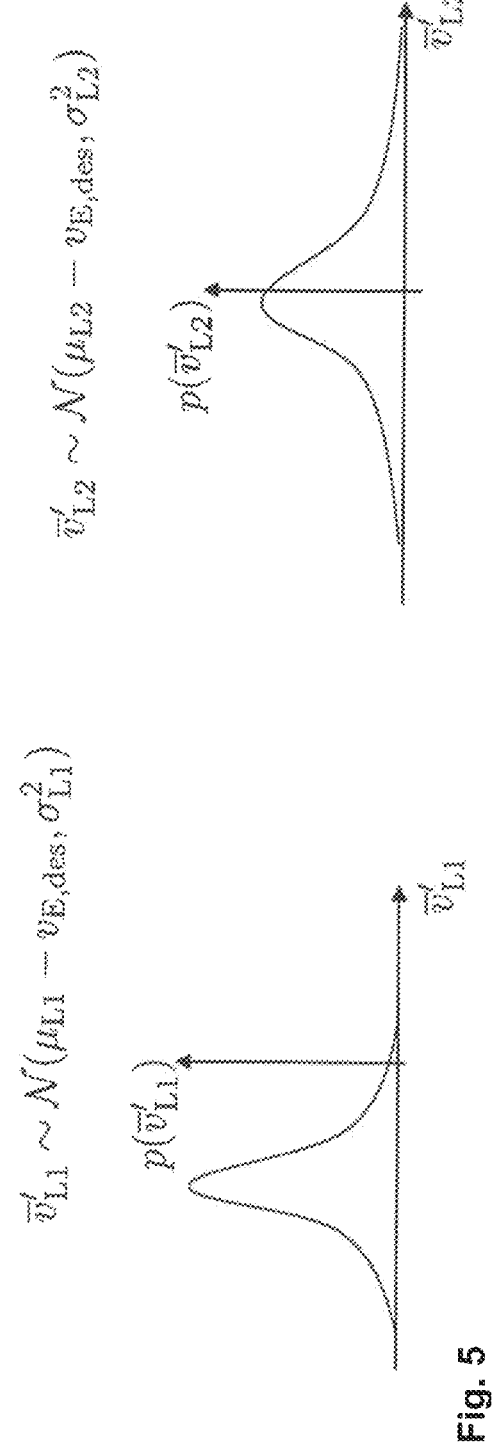
FIG. 5 schematically shows exemplary adjusted normal distributions of the speed in the first and second lanes.

In the present case, therefore, a normally distributed probability that a certain speed prevails in the respective lane L1, L2 is taken into account (step 221 in FIG. 4). The normal distributions $\bar{v}_{L1}$ and $\bar{v}_{L2}$ are given, as usual, by a mean p and a variance o. The desired speed also indicated in FIG. 4 $V_{E,des}$ is, for example, a target speed for autonomous/semi-autonomous driving. This desired speed or target speed $V_{E,des}$ is usually a fixed value and therefore has no variance, so that the normal distributions $\bar{v}'_{L1}$ and $\bar{v}'_{L1}$ can be shifted by the value of the desired speed $V_{E,des}$. These shifted/adjusted normal distributions $\bar{v}'_{L1}$ and $\bar{v}'_{L2}$ are shown schematically in FIG. 5. The calculation is simplified by the resulting lower values.

A difference distribution can then be determined according to equation (1) as a random variable for the calculation of the probability according to step 220:

$$\bar{v}'_{diff} = \bar{v}'_{L1} - \bar{v}'_{L2} \quad (1),$$

In particular, for this, the difference between the mean values/J of the respective normal distribution $\bar{v}'_{L1}$ and $\bar{v}'_{L2}$ of the driving speed for each lane L1, L2 according to equation (2) is formed, and the variance o of the respective normal distribution $\bar{v}'_{L1}$ and $\bar{v}'_{L2}$ of the driving speed for each lane according to equation (3) is added:

$$\mu_{diff} = \mu_{L1} - \mu_{L2} \quad (2), \text{ und}$$

$$\sigma_{diff}^2 = \sigma_{L1}^2 + \sigma_{L2}^2 \quad (3),$$

In other words, the difference distribution $\bar{v}_{diff}$ from equation (1) includes the mean $\mu_{diff}$ from equation (2) and the standard deviation (variance) $\sigma_{diff}^2$ from equation (3). The suffix "L1" here designates the first lane, that is the current lane L1 of the driver's vehicle 1, and the suffix "L2" designates the second lane L2, that is, the adjacent lane into which it is possible to change.

The probability that other vehicles 2 are driving at higher speed in lane L2, which is adjacent to a current lane L1 of the vehicle, can thus be calculated as follows:

$$P_{\bar{v}_{diff}}(0) = P(\bar{v}_{diff} \leq 0) = P(\bar{v}_{L1} - \bar{v}_{L2} \leq 0) = \int_{-\infty}^{0} p_{\bar{v}_{diff}}(t) dt = e \quad (4),$$

where the value "e" represents the probability calculated in step 220 and is used for further calculations.

With reference again to FIG. 3, in an optional step 230 a leak integrator can be applied to the calculated probability. The leak integrator can be set as desired and is intended to increase the calculated probability over time (in successive iterations of the method according to FIG. 3).

This means that if the initial values are otherwise the same, the probability considered will reach a value that corresponds to or is greater than a threshold value for initiating a lane change.

Subsequently, after step 230 (or immediately after step 220), a hysteresis is applied to the calculated probability. The hysteresis is dependent on a driving parameter that is itself dependent on a last lane change. For example, the distance traveled since the last lane change and/or since the length of time elapsed since the last lane change can form the driving parameter (distance traveled or travel time). The hysteresis is also set such that the calculated probability is kept at zero or a value that is less than the threshold value for initiating a lane change. This can prevent a lane change shortly after a previous lane change.

Finally, a command to change lanes is issued in step 250. This command can be issued as a function of the above-mentioned threshold value for initiating a lane change. In step 250, the calculated probability after application of (the leak integrator and) the hysteresis can be compared with the threshold value. If the calculated probability is equal to or greater than the threshold value, the lane change command is issued. The command can be output, for example, in the form of a signal that is output to a vehicle component, for example a controller for autonomous/semi-autonomous driving.

Finally, after step 250, the leak integrator can be reset in a further step 260, for example set to zero. The hysteresis can also be reset here.

Figure 6:
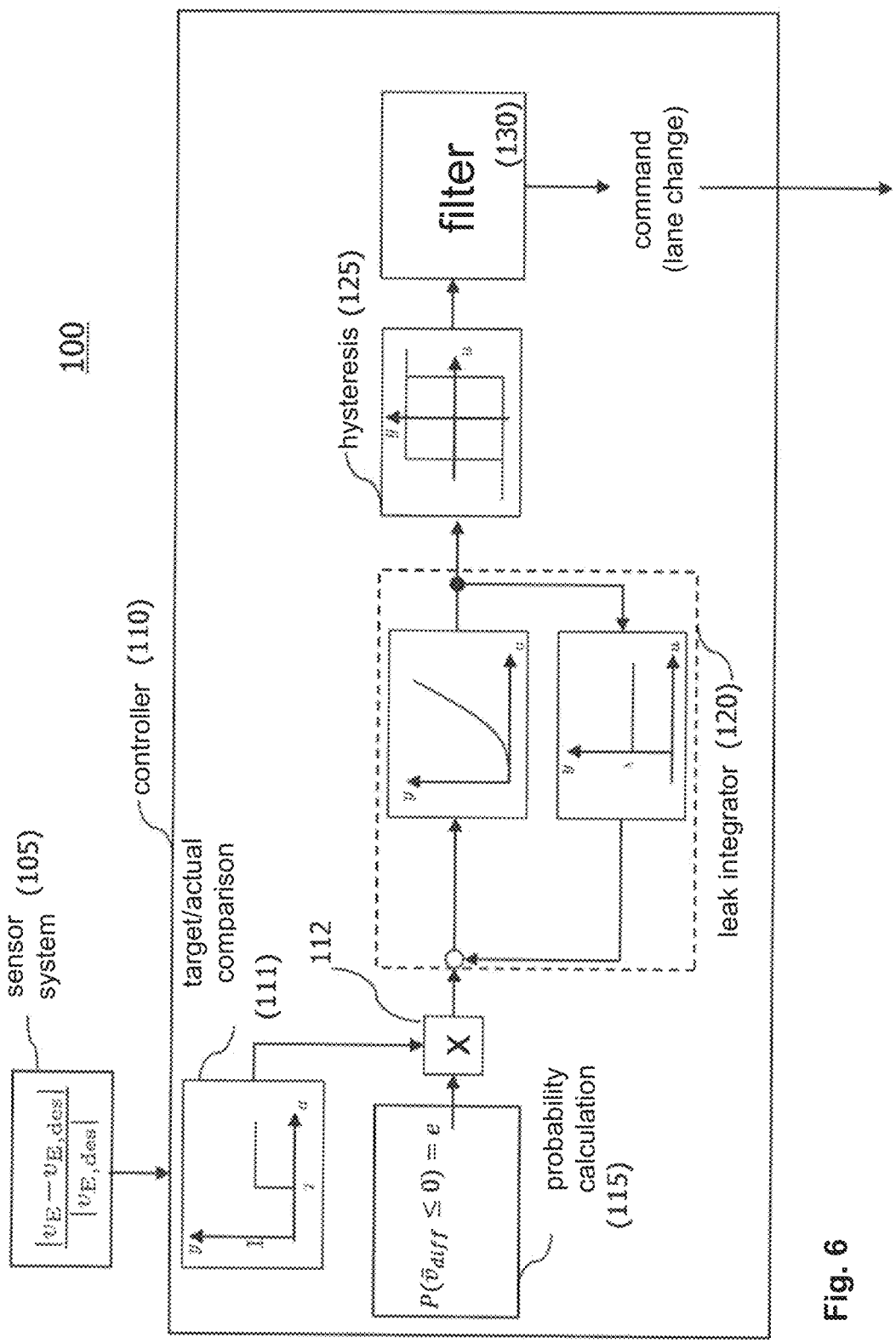
FIG. 6 schematically shows a driver assistance system.

FIG. 6 schematically shows a driver assistance system 100, which comprises at least one sensor 105 or a sensor system 105, which records and outputs the environment data that represent an environment of the driver's vehicle 1. This includes, for example, the location and the speed of another vehicle 2 or stationary object detected in the surroundings of the driver's vehicle 1. The detection of an adjacent lane L2 can also be carried out by the at least one sensor 105.

The data obtained from the sensor/sensor system 105 are forwarded to a controller 110 of the driver assistance system 100. For this purpose, the sensor/sensor system 105 is coupled to the controller 110, for example electrically and/or optically connected by means of a bus.

The controller 110 can have a section 111 that calculates/performs a target/actual comparison between the actual speed of the driver's vehicle 1 and the desired speed (target speed). For example, the section 111 can output a signal when the deviation of the actual speed from the target speed is greater than a threshold value T.

Another section 115 of the controller 110 can perform a probability calculation in accordance with step 220. The result or signal from section 115 is electronically coupled to the output of section 111 in section 112. In section 112, the signals of the section 115 are only passed on if the signal from section 111 is greater than zero (for example one).

In another (optional) section 120, a leak integrator can be applied to the output signals of the section 112. Here, a (for example constant) factor A can cause a steady increase in the calculated probability (output signal from section 115 or 112).

In a further section 125, a hysteresis is applied to the signal representing the calculated probability. As described above, the hysteresis is dependent on a driving parameter and a lane change last carried out. The hysteresis 125 can, like the section 111, pass on or reduce the output signal of the section 112 or optionally 120 unchanged or can even set it to zero. The signal is reduced or set to zero if the driving parameter does not exceed a threshold value as a function of the last lane change, for example a distance traveled since the last lane change or an elapsed time period is less than the threshold value.

If the signal has passed through the hysteresis section 125 unchanged, the signal can be filtered in a further optional section 130. For example, external boundary conditions can be taken into account in order to allow the signal representing the calculated probability to pass through or to be reduced or to set it to zero. The signal can be reduced or set to zero, for example, if an adjacent lane, to which it may be possible to change, ends shortly, or if due to a navigation process a lane change would no longer enable the navigation process or would make it more difficult. The filter 130 can thus be activated or deactivated by any external factor.

If the signal now also passes through filter 130, the controller 110 issues a command to change lanes. A corresponding signal representing this command can be used by the controller 110 or another control module of the vehicle 1 in order to carry out a lane change, in particular a discretionary lane change.

The structural elements, components and/or sections shown in FIG. 6 and the entire controller 110 can be implemented by individual electronic components. Alternatively or additionally, at least individual sections of the controller 110 can be implemented by software, wherein for this the controller 110 comprises or represents a processor (not shown) that executes computer program instructions that correspond to the function of the respective sections 111 to 130.

It is understood that the embodiments described above are not exhaustive and do not limit the object disclosed here.

The invention claimed is:

1. A method for determining a lane change for a driver assistance system (100) of a vehicle (1), wherein the method comprises:
calculating (220) a probability that other vehicles (2) are driving at a higher speed in a lane (L2) which is adjacent to a current lane (L1) of the vehicle (1);
applying (230) a leak integrator to the calculated probability;
applying (240) a hysteresis to the calculated probability based on a driving parameter dependent on a last lane change;
issuing (250) a command to change lanes depending on the probability; and
controlling the vehicle to change lanes providing the calculated probability remains above a threshold value.

2. The method according to claim 1, wherein the driving parameter for the hysteresis is a distance traveled since the last lane change and/or a period of time elapsed since the last lane change.

3. The method according to claim 1, wherein the leak integrator increases the calculated probability over time.

4. The method according to claim 3, further comprising:
resetting (260) the leak integrator when a lane change takes place.

5. The method according to claim 4, wherein the method further comprises:
determining (200) an actual speed of the vehicle (1) and a target speed of the vehicle (1); and
comparing (210) a deviation of the actual speed from the target speed with a threshold value;
wherein the steps of applying hysteresis, applying a leak integrator and issuing a command to change lanes are only carried out if the deviation is greater than or equal to the threshold value.

6. The method according to claim 5, wherein the calculation of a probability comprises:

determining (221) a normal distribution of the vehicle speed for each lane; and
calculating a difference distribution by subtracting the normal distribution of the driving speed of an adjacent lane from the normal distribution of the driving speed of the current lane of the vehicle; and
calculating the probability that other vehicles are traveling at a higher speed in the lane that is adjacent to a current lane of the vehicle, based on the calculated difference distribution.

7. The method according to claim 6, wherein calculating a difference distribution comprises forming a difference of the mean values of the respective normal distribution of the vehicle speed for each lane and adding the variance of the respective normal distribution of the vehicle speed for each lane.

8. The method according to claim 1, further comprising:
resetting (260) the leak integrator when a lane change takes place.

9. A vehicle (1) with a driver assistance system (100) according to claim 8.

10. The method according to claim 1, wherein the method further comprises:
determining (200) an actual speed of the vehicle (1) and a target speed of the vehicle (1); and
comparing (210) a deviation of the actual speed from the target speed with a threshold value;
wherein the steps of applying hysteresis, applying a leak integrator and issuing a command to change lanes are only carried out if the deviation is greater than or equal to the threshold value.

11. The method according to claim 1, wherein the calculation of a probability comprises:
determining (221) a normal distribution of the vehicle speed for each lane; and
calculating a difference distribution by subtracting the normal distribution of the driving speed of an adjacent lane from the normal distribution of the driving speed of the current lane of the vehicle; and
calculating the probability that other vehicles are traveling at a higher speed in the lane that is adjacent to a current lane of the vehicle, based on the calculated difference distribution.

12. A driver assistance system (100) for a vehicle (1), comprising:
at least one sensor (105) which is set up to record and/or to process at least one driving parameter of the vehicle (1); and
a controller (110) which is coupled to the at least one sensor (105) and which is set up to carry out the method for determining a lane change according to claim 1.

* * * * *